Patented Dec. 11, 1945

2,390,779

UNITED STATES PATENT OFFICE 2,390,779

PROCESS OF PRODUCING BUTYLENE GLYCOL BY FERMENTATION AND RECOVERING THE PRODUCT

Ralph T. K. Cornwell, Fredericksburg, Va., assignor to Sylvania Industrial Corporation, Fredericksburg, Va., a corporation of Virginia No Drawing. Application May 27, 1943,
Serial No. 488,740

6 Claims. (Cl. 260—637)

This invention relates in general to fermentation and in particular to a process for the separation of 2,3-butylene glycol from the products of fermentation of carbohydrates as in 2,3-butylene glycol beer and to correlated improvements designed to facilitate the recovery of the butylene glycol.

As a result of the present shortage of natural rubber, the production of synthetic rubber, in particular of so-called synthetic rubber from butadiene, has become increasingly necessary. One of the common sources of butadiene is 2,3-butylene glycol, but the present sources of supply of 2,3-butylene glycol are not sufficient to satisfy the proposed requirements for butadiene. Accordingly, attempts have been made to produce 2,3-butylene glycol by fermentation of carbohydrates but separation of the 2,3-butylene glycol so produced from the products of fermentation is attended with numerous difficulties. For example, if the material fermented is a high test cane molasses or a corn mash, the fermented product is a very complex mixture comprising (a) some unfermented carbohydrate, (b) organic colloids including proteins, gums, and the products of the decomposition of the carbohydrates, (c) inorganic salts, including the initial salts and those added as nutrients and to maintain the pH value, (d) the yeast, and (e) volatile organic compounds including butylene glycol, ethyl alcohol, and traces of glycerol, acetic acid, and higher alcohols.

The separation of the 2,3-butylene glycol from this complex system is a tedious, expensive and complicated process when carried out according to the prior practice which has usually been (1) extraction with an organic solvent, or (2) fractional distillation. The extraction process requires a large volume of a volatile solvent and after extraction the volatile solvent must be separated from the glycol by fractional distillation. In the straight distillation process of recovery, the fermentation products are subjected to distillation first to distill the lower alcohols and water and then to boil off the 2,3-butylene glycol. The distillation of such a high boiling compound from such a complex system results in substantial losses of the glycol. Also, in the first process, substantial quantities of the extracting solvent and of the glycol are always lost and in the second process the presence of the complex organic colloids interferes with the process of distillation. Up to the present time no satisfactory method has been evolved for the efficient and economical separation of 2,3-butylene glycol from a fermented carbohydrate solution.

Accordingly, it is a general object of the present invention to provide a process for the separation of 2,3-butylene glycol from the products of fermentation in an efficient and economical manner.

It is a further object to provide a method for the separation of 2,3-butylene glycol from "2,3-butylene glycol fermentation beer" in an efficient, rapid and economical manner, while avoiding the disadvantages of the prior methods.

Other objects of the invention will in part be obvious and will in part appear hereinafter.

According to the present invention, there is provided a process for the production of 2,-3 butylene glycol comprising fermenting a carbohydrate dispersion with a suitable organism for the production of 2,3-butylene glycol and separating the butylene glycol from the products of fermentation by dialysis through a semi-permeable membrane comprising a hydrophilic cellulosic pellicle, more particularly a non-fibrous regenerated cellulosic pellicle. If desired, the 2,3-butylene glycol may be separated from the water-soluble salts by distillation of the glycol or by chemical treatment such, for example, as by treating the liquid with base exchange salts or base exchange resins as will be hereinafter more particularly described.

When the carbohydrate to be fermented is derived from grain, such as corn, the fermented solution will contain a substantial quantity of dextrine which dialyzes through the membrane with the 2,3-butylene glycol. The dextrine may be readily removed by rendering the carbohydrate solution slightly acid and heating it to hydrolyze the dextrine to glucose. The glucose is then fermented along with the other sugars into 2,3-butylene glycol. Alternatively, the hydrolysis of the dextrine can be effected after the glycol fermentation and before or after dialysis (but preferably before) and the glucose thus produced is then fermented to ethyl alcohol by means of yeast and the alcohol recovered by distillation.

The invention comprises, accordingly, a process having the steps and relation of steps one to another as will be given in the following detailed description, and the scope of the application of which will be indicated in the claims.

For the carbohydrate raw materials there may be employed, in general, starches or sugars or materials containing one or more of these substances, such, for example, as maize and potato mashes, which may or may not be subjected first to saccharification, or mashes of rye, barley, wheat, oats, buckwheat, and similar starchy materials; also raw materials containing fermentable sugar, such, for example, as beet molasses, cane molasses, sorghum, maple and palm sugar syrups; milk-sugar, and the like.

Such carbohydrate materials are fermented by means of suitable organisms, such, for example, as *Clostridium polymyxa* and *Aerobacter aerogenes*. To accelerate the fermentation there should be added to the carbohydrate dispersion suitable phosphatic and nitrogen-containing substances and other nutrient salts, such, for example, as magnesium sulphate, ammonium chloride, potassium hydrogen phosphate, and calcium chloride. In general the fermentation proceeds best at a pH of between 6 and 7, preferably 6.5, and at a temperature of from 30 to 40° C., preferably 36 to 38° C. It has been found that artificial aeration, produced by blowing air or oxygen through the carbohydrate dispersion, is desirable. The concentration of the carbohydrate may range from 6 to 10%, preferably 8%. It is to be understood that if desired the fermentation can be repeated by adding fresh carbohydrate to the fermented liquor with or without the addition of fresh organisms until a sufficient concentration of 2,3-butylene glycol has been obtained. Generally speaking, the yields according to the present invention will be between 30 and 50%.

After the fermentation has been completed, the fermented liquor may be filtered, although one advantage of the present process is that filtration is not necessary before separation of the butylene glycol. It is preferred to render the fermented liquor acid if it is not already in an acid condition to protect the copper parts of the still from the effects of ammonia which would otherwise be released. The volatile compounds having a boiling point below that of the butylene glycol are first distilled off and the solution concentrated to about 30-50% solids. The concentrated solution is then subjected to the dialysis operation hereinafter described.

The fermented liquor, with or without concentration or separation of the highly volatile compounds, is dialyzed by flowing the liquor on one side of a semi-permeable membrane and flowing water counter-current thereto on the opposite side of the membrane. The membrane may comprise any semi-permeable sheet or film, such, for example, as parchment paper or a hydrophilic pellicle such as Cellophane or tubing which may be derived from viscose but is preferably obtained by the denitration of high viscosity nitrocellulose. It may be a hydrophilic membrane comprising a hydrophobic cellulose derivative in a water-swollen gel state. The latter membrane may be prepared by dissolving a hydrophilic organic solvent-soluble cellulose derivative in a suitable organic solvent, extruding or casting such solution in the form of a sheet or tubing, coagulating the cellulose derivative in such form by means of an aqueous bath to produce a membrane in the water-swollen gel state. The membrane is maintained in the wet gel state, without drying, from the time of coagulation until the time of dialysis. Such a membrane is superior in strength, rapidity of dialysis, and permanency and resistance to decomposition as compared to the regenerated cellulose membrane.

The dialysis is preferably carried out at an elevated temperature, for example, above 170° F., to promote the diffusion of the water-soluble ingredients of the fermented liquor into the water. Any suitable sheet or tube dialyser may be employed but in the preferred embodiment there is employed a multi-tube dialyser. During dialysis water diffuses into the fermented liquor with the result that this liquor is continuously diluted. To avoid excessive dilution the fermented liquor is preferably confined between two membranes or two tubes with water contacting one of the membranes and an air stream being blown over the other exposed membrane. When thus dialyzed, the air stream causes evaporation of water from the fermented liquor while the butylene glycol is dialyzing from the other membrane into the water. Thus, dilution of the fermented liquor and decrease in the rate of dialysis is avoided. Alternatively, the slop may be continuously concentrated by evaporation at some point in the system, the slop being circulated between the evaporator and the dialyser. The diffusate comprises an aqueous solution of butylene glycol and traces of glycerine, water-soluble inorganic salts, dextrins, and unfermented sugars. If the amount of glycerine present is objectionable, this may readily be separated from the solution by distillation which can now be carried out in rapid manner because the solution being distilled no longer contains the carbohydrate decomposition products, the yeast, or the organic colloids which were present in the fermented liquor.

The inorganic salts may be separated from the butylene glycol, if necessary, by precipitation with suitable chemical reagents or by passing the dialysate into contact with base exchange salts or base exchange resins whereby the salts are removed or converted to sodium compounds.

By way of illustration but not by way of limiting the invention, there will be given the following specific examples:

Example I

There is prepared a corn mash comprising an aqueous solution containing 8% fermentable starches and sugars; magnesium sulphate 7.5%; ammonium chloride 7.3%; sodium hydrogen phosphate, 7.15%; and a trace only of calcium chloride. The pH is adjusted and the solution fermented at 36° C. with *Aerobacter aerogenes*. After fermentation is substantially complete, the fermented liquor is rendered slightly acid, if necessary, and any ethyl alcohol produced is evaporated and recovered and the solution then concentrated so that the total solids comprise 30 to 50% by evaporation of water. The concentrated solution is then dialyzed at a temperature of 170° F. or above between two membranes with water at the same temperature running counter-current to the solution on the opposite side of one membrane, and the dialysis carried out with sufficient contact to give a recovery of over 90% of the butylene glycol contained in the fermented liquor. The slop and the water may be both recirculated. The resulting solution is concentrated and purified and then employed for the production of butadiene.

Example II

A fermentation slop containing 2,3-butylene glycol is filtered through filter cloth to give a slightly brownish filtrate containing 4.25% of 2,3-butylene glycol, 1.2% ash and a viscosity of 1.06. The filtrate is then dialyzed continuously against pure water, using a dialysis membrane in the form of a regenerated cellulose tubing formed by the denitration of a nitrocellulose tubing made from a nitrocellulose of high viscosity, such as a 1000 second nitrocellulose. The ratio of the flow of slop to the flow of water is 1 to 1.81. The recovery of the 2,3-butylene glycol based on the original content is equal to 84.3 in the first dialysis. In a second dialysis the recovery is 82.4% of the original 2,3-butylene glycol. To remove the water-soluble salts in the diffusate, the diffusate is subjected to treatment with a synthetic resin ion exchange absorbent, such as Amberlites IR-100 and IR-4. The Amberlite IR-100 is used in the hydrogen cycle (hydrochloric acid as the regenerant) whereas IR-4 is used in the potassium cycle (potassium carbonate used as regenerant. The diffusate is first run through a column of IR-100 and then through a column of IR-4. It is near water-clear when coming off the IR-4 column. About one gallon of this diffusate thus obtained is concentrated to 210 cc. This 210 cc. contains 16.9% 2,3-butylene glycol and the ash content is 0.13%. The specific gravity is 1.2.

The 2,3-butylene glycol is determined according to the following method: An aliquot sample is taken and treated with 70-75 ml. of N/500 periodic acid. The solution is left standing for 30 minutes in a closed vessel. The periodic acid converts the 2,3-butylene glycol into the corresponding aldehyde (acetylaldehyde). The excess periodic acid is neutralized with semi-normal NaOH, rosolic acid being used as indicator. 2.3 g. of sodium sulfite are dissolved in distilled water, exactly neutralized with rosolic acid as indicator, and added to the above solution. Titrate with semi-normal hydrochloric acid and calculate amount of 2,3-butylene glycol. This method checks very well with an elaborate method published by Brockmann and Werkman in Industrial Engineering Chemistry, Anal. Sect., 5, 206 (1933).

The solution of 2,3-butylene glycol thus produced contains a substantial quantity of unfermented water-soluble dextrins. If it is desired to remove such dextrins or to avoid their diffusion, the dextrins, before or after dialysis, but preferably prior to glycol fermentation and dialysis, may be hydrolyzed to glucose by rendering the slop slightly acid and heating. The glucose is then fermented to alcohol either before or simultaneously with the fermentation of the sugars to butylene glycol. Any alcohol thus produced is first distilled off and the solution remaining in the still subjected to dialysis for the recovery of the butylene glycol as herein described.

The separation of the butylene glycol from the fermented liquor according to the present invention results in numerous advantages comprising, inter alia, the avoidance of filtration of the fermented liquor, prevention of foaming, and a rapid and efficient recovery without an expensive heat exchange system. Moreover, the butylene glycol separated by dialysis has so little coloring matter that decolorization by means of activated carbon and the like is not necessary. Other advantages of the present process will be obvious to those skilled in the art. From the butadiene thus produced, there may be prepared synthetic rubber of various types in the known manner.

Having described my invention, what I claim as new and desire to secure by Letters Patent is:

1. In a process for the production of 2,3-butylene glycol by fermenting a carbohydrate solution to produce 2,3-butylene glycol, the step comprising separating the 2,3-butylene glycol from the fermented solution by dialysis through a semi-permeable membrane comprising a hydrophilic cellulosic material.

2. In a process for the production of 2,3-butylene glycol by fermenting a carbohydrate solution to produce 2,3-butylene glycol, the steps comprising separating the 2,3-butylene glycol from the fermented solution by dialysis through a semi-permeable membrane comprising a hydrophilic cellulosic material, and removing water-soluble salts from the diffusate by contacting the diffusate with a base exchange compound.

3. In a process for the production of 2,3-butylene glycol by fermenting a carbohydrate solution to produce 2,3-butylene glycol, the steps comprising distilling from said fermented solution volatile substances boiling below the boiling point of 2,3-butylene glycol, and separating the 2,3-butylene glycol from the fermented solution by dialysis through a semi-permeable membrane comprising a hydrophilic cellulosic material.

4. In a process for the production of 2,3-butylene glycol by fermentation of a carbohydrate solution, the steps comprising separating the 2,3-butylene glycol from the products of fermentation by dialysis through a semi-permeable membrane comprising a non-fibrous regenerated cellulose pellicle.

5. In a process for the production of 2,3-butylene glycol by fermentation of a carbohydrate solution, the steps comprising separating the 2,3-butylene glycol from the products of fermentation by dialysis through a semi-permeable membrane comprising a tube formed of regenerated cellulose.

6. In a process for the production of 2,3-butylene glycol by fermentation of a carbohydrate solution, the steps comprising separating the 2,3-butylene glycol from the products of fermentation by dialysis through a semi-permeable membrane comprising a tube formed of regenerated cellulose resulting from the denitration of high viscosity nitrocellulose.

RALPH T. K. CORNWELL.